US010285125B2

(12) United States Patent
Kukosa (10) Patent No.: US 10,285,125 B2
(45) Date of Patent: *May 7, 2019

(54) METHOD OF OPERATING A COMMUNICATION DEVICE OPERABLE IN AN ACTIVE MODE AND IN AN IDLE MODE, A COMPUTER PROGRAM PRODUCT FOR EXECUTING THE METHOD, AND THE COMMUNICATION DEVICE OPERABLE IN AN ACTIVE MODE AND IN AN IDLE MODE (71) Applicant: Unify GmbH & Co. KG, Munich (DE)

(72) Inventor: Tomas Kukosa, Mokra (CZ)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,936

(22) Filed: Jul. 26, 2018

(65) Prior Publication Data
US 2018/0359705 A1  Dec. 13, 2018

Related U.S. Application Data (63) Continuation of application No. 15/183,027, filed on Jun. 15, 2016, now Pat. No. 10,070,384, which is a
(Continued)

(51) Int. Cl.
*H04W 48/18* (2009.01)
*H04W 52/02* (2009.01)
(Continued)

(52) U.S. Cl.
CPC ... *H04W 52/0225* (2013.01); *H04W 52/0274* (2013.01); *H04W 48/18* (2013.01);
(Continued)

(58) Field of Classification Search
CPC .................................................. H04W 52/0225
(Continued)

(56) References Cited

U.S. PATENT DOCUMENTS 6,731,957 B1  5/2004  Shamoto et al.
7,791,469 B2  9/2010  Chen et al.
(Continued)

FOREIGN PATENT DOCUMENTS

EP  1708369 A1  10/2006

OTHER PUBLICATIONS

"IEEE Standard for Ethernet" IEEE Computer Society; IEEE Std. 802.3; Dec. 28, 2012.
(Continued)

*Primary Examiner* — Peter G Solinsky
(74) *Attorney, Agent, or Firm* — Buchanan Ingersoll & Rooney PC (57) ABSTRACT A method of operating a communication device comprises providing the communication device (T, T1-T5) with a first interface (I1) to connect to a first network (N1), which provides a first bandwidth and a first network idle power consumption at the communication device (T, T1-T5), when being connected to the first network (N1) and providing the communication device (T, T1-T5) with a second interface (I2) to connect to a second wireless network (N2), which provides a second bandwidth, which is smaller than the first bandwidth, and a second network idle power consumption, which is smaller than the first idle power consumption, at the communication device (T, T1-T5), when being connected to the second wireless network (N2).

20 Claims, 4 Drawing Sheets

Related U.S. Application Data continuation of application No. 14/343,949, filed as application No. PCT/EP2012/002410 on Jun. 6, 2012.

(51) Int. Cl.
*H04W 88/02* (2009.01)
*H04W 88/06* (2009.01)

(52) U.S. Cl.
CPC ............ *H04W 88/02* (2013.01); *H04W 88/06* (2013.01); *Y02D 70/00* (2018.01); *Y02D 70/1222* (2018.01); *Y02D 70/142* (2018.01); *Y02D 70/144* (2018.01); *Y02D 70/162* (2018.01)

(58) Field of Classification Search
USPC ......................................................... 370/311
See application file for complete search history.

(56) References Cited

U.S. PATENT DOCUMENTS

| | | | |
|---|---|---|---|
| 8,055,306 B2 | 11/2011 | Li | |
| 8,311,021 B2 | 11/2012 | Saifullah et al. | |
| 8,498,282 B2 | 7/2013 | Doi et al. | |
| 8,627,127 B2 | 1/2014 | Mucignat et al. | |
| 8,693,407 B2 | 4/2014 | Khandekar et al. | |
| 8,943,352 B1 | 1/2015 | Warneke | |
| 10,070,384 B2 * | 9/2018 | Kukosa | H04W 52/0274 |
| 2003/0054703 A1 | 3/2003 | Fischer et al. | |
| 2004/0063451 A1 | 4/2004 | Bonta et al. | |
| 2007/0135162 A1 | 6/2007 | Banerjea et al. | |
| 2007/0297373 A1 | 12/2007 | Saifullah et al. | |
| 2008/0080416 A1 | 4/2008 | Park et al. | |
| 2009/0170554 A1 | 7/2009 | Want et al. | |
| 2009/0243391 A1 | 10/2009 | Susong, III et al. | |
| 2010/0002676 A1 | 1/2010 | Doi et al. | |
| 2010/0311473 A1 | 12/2010 | Deshpande et al. | |
| 2011/0050454 A1 | 3/2011 | Luis Sanchez et al. | |
| 2011/0221590 A1 | 9/2011 | Baker et al. | |
| 2011/0292853 A1 | 12/2011 | Balasubramaniam et al. | |
| 2011/0293265 A1 | 12/2011 | Grobe et al. | |
| 2012/0003976 A1 | 1/2012 | Bhat et al. | |
| 2012/0062479 A1 | 3/2012 | Feldstein et al. | |
| 2012/0151028 A1 | 6/2012 | Lu et al. | |
| 2012/0167118 A1 | 6/2012 | Pingili et al. | |
| 2013/0207593 A1 | 8/2013 | Kong et al. | |
| 2014/0052832 A1 | 2/2014 | Dina et al. | |

OTHER PUBLICATIONS

Written Opinion of the International Searching Authority for PCT/EP2012/002410 dated Apr. 5, 2013.
International Search Report for PCT/EP2012/002410 dated Apr. 5, 2013.
IEEE Std. 802.15.4-2003; IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANS)" Oct. 1, 2003.

* cited by examiner

METHOD OF OPERATING A COMMUNICATION DEVICE OPERABLE IN AN ACTIVE MODE AND IN AN IDLE MODE, A COMPUTER PROGRAM PRODUCT FOR EXECUTING THE METHOD, AND THE COMMUNICATION DEVICE OPERABLE IN AN ACTIVE MODE AND IN AN IDLE MODE

CROSS REFERENCE TO RELATED APPLICATIONS

This application is a continuation of U.S. patent application Ser. No. 15/183,027, which is a continuation of U.S. patent application Ser. No. 14/343,949, filed on Mar. 10, 2014 as the United States national phase under 35 U.S.C. § 371 of PCT international patent application No. PCT/EP2012/002410, filed on Jun. 6, 2012.

BACKGROUND OF THE INVENTION

Field of the Invention

Embodiments relate to methods of operating a communication device which is operable in an active mode and in an idle mode. The invention further relates to a computer program product for executing such a method and to the communication device which is operable in an active mode and in an idle mode.

Background of the Related Art

Modern communication devices such as mobile phones or IP phones (IP: Internet Protocol) are usually connected to a network such as the internet for communication purposes. Most of the time the device may be in an idle mode and only for short periods of time the device is in an active mode. In data communications, an idle mode may be defined as a mode in which no transmissible data are present on a given connection. In particular, during the idle mode, services of the data link layer or link layer (OSI layer 2) are not provided for data exchange. The bit transmission layer or physical layer (OSI layer 1) may be able to transfer data, but the data link layer is neither able to send not to receive instructions or messages. Therefore, a communication instance of the data link layer is unable to operate according to an appointed protocol in the idle mode. Whereas organizational data traffic such as transmission of signaling data may occur, in the idle mode there is no traffic of payload data. An idle mode frequently occurs when at a wired communication device such as an office phone, a handle of the wired communication device is on-hook. In mobile communications, the idle mode may be defined as the mode in which there is no active network connection, a mobile communication device in the idle mode may permanently search for a radio cell suitable to be connected to wherein organizational channels (BCCH, CCCH, CBCH) of the radio cell are permanently received and processed by the mobile communication device. Such data traffic which is required for maintaining the communication device to be able to send and/or receive payload data is not regarded payload data traffic but regarded to be comprised by signaling data traffic. A mobile communication device such as a mobile phone frequently switches into the idle mode when there is no active network connection which is established if a user of the mobile communication device initiates a phone call. An active network connection is also established if an answering machine of a wired or mobile communication device is operating to send and/or receive a message. In the following, the idle mode of a communication device may be defined as the mode in which an established physical layer and an established data link layer of a network are dispensable for data transmission.

In contrast to the idle mode, the active mode may be defined as a mode of a communication device in which an active network connection is established or is necessary to be established. Payload data which a user of the communication device wants to transmit to another communication device of another user is transmitted over the active network connection. Before, during or after the payload transmission, signaling data transmission may occur. For transmitting communication data bidirectionally and in real time, such as speech data and/or video data, high bandwidth network connections are required in the active mode. On the other hand, in the idle mode, when no payload data is to be transferred, a power consumption of the mobile device should be as low as possible. In the following, the active mode of a communication device may be defined as the mode in which an established physical layer and an established data link layer of a network are required for data transmission.

IP phones are often connected via Ethernet. Ethernet is an example of a local area network (LAN) which is a computer network that interconnects computers in a limited area such as a home, school, computer laboratory, or office building using network media. The defining characteristics of LANs in contrast to wide area networks (WANs) or global area networks (GANs) include their usually higher data transfer rates, smaller geographic area, and lack of a need for leased telecommunication lines. Usually, a LAN is limited in its extension without further measures of approximately 500 m. The power consumption of the Ethernet itself, meaning the Ethernet connection to a communication device without the communication device, is approximately between 10 and 100 mW. Currently used IP phones are unable to decrease their power consumption significantly under 1000 mW because of the used components and the used hardware design. Therefore, the power consumption of the Ethernet itself is negligible with respect to the power consumption of the communication device connected to the Ethernet.

However, with recent power efficient components such as microcontrollers (MCUs) which are able to operate below approximately 10 mW in low power mode or approximately 100 µA in sleep mode, the power consumption of the Ethernet connection is not negligible any more with respect to the power consumption of the communication device comprising such a microcontroller. A microcontroller or microcontroller unit commonly is a single chip that contains a processor, RAM, ROM (read only memory) clock and I/O (input/output) control unit. A low power mode of a microcontroller may be established for example by switching off external circuits, power budgeting measures, configuring port pins, using high value pool-up resistors, reducing operating voltage, using an external source for CPU (central processing unit) core voltage, and/or using a battery backup for the microcontroller. A sleep mode of a microcontroller also called standby mode is often established in that the microcontroller's high frequency clock oscillator remains running, but the clock tree that drives the CPU circuitry is disabled. In sleep mode, the high-frequency peripheral clock trees are commonly kept alive, allowing autonomous functioning of high-speed peripherals such as a direct memory access (DMA), high-speed serial ports, analog-to-digital and digital-to-analog converters and AES (Advanced Encryption Standard) encryption/decryption. In sleep mode, the RAM (Random Access Memory) remains active and may be accessed by the DMA controller, allowing data retrieved by peripherals to be stored without CPU intervention (CPU: Central Processing Unit). The power consumption of a microcontroller can be lowered even more in the so called deep sleep mode, in which the high frequency MCU oscillator is disabled but the oscillator used to drive critical peripherals is kept running. These may include the real-time clock (RTC) and a watchdog timer as well as a power-on reset and a brown-out detection circuity.

Such advanced MCUs are able to provide a current draw in deep sleep mode of 0.59 µA and still retain full register and RAM contents. For other MCUs the current consumption may range from 10 µA to 30 µA. The time to return to active mode will vary from 2 µs for an optimized design to 8 µs. With such advanced microcontrollers being widely utilized in modern communication devices the power consumption of the network the communication device is connected to, for example the Ethernet according to IEEE 802.3 standard, is not negligible anymore and should be lowered as much as possible for efficient usage of energy. IEEE 802.3 is a working group and a collection of IEEE standards by the working group defining the physical layer and data link layer's media access control (MAC) of wired Ethernet. Physical connections are usually made between nodes and/or infrastructure devices such as hubs, switches, and/or routers by various types of copper or fiber cable. In an effort to reduce the power consumption of Ethernet-LANs the IEEE 802.3az standard has been ratified in September 2010, also called energy-efficient Ethernet or Green Ethernet. This standard is a set of enhancements to the twisted-pair and backplane Ethernet family of computer networking standards that will allow for less power consumption during periods of low data activity.

BRIEF SUMMARY OF THE INVENTION

Embodiments may lower the power consumption of a communication device connected to a network by the provision of a method of operating the communication device, a computer program product for executing the method, and a respective communication device. The lowered power consumption of the communication device should be realized in a simple way which is low-cost, leads to a low power consumption in the idle mode, sufficient bandwidth for data transmission available in the active mode, and allow for switching between the idle mode and the active mode controllable from the network.

An inventive method of operating a communication device comprises the following steps. Providing the communication device with a first interface to connect to a first network, which provides a first bandwidth and a first network idle power consumption at the communication device, when being connected to the first network, providing the communication device with a second interface to connect to a second wireless network, which provides a second bandwidth, which is smaller than the first bandwidth, and a second network idle power consumption, which is smaller than the first idle power consumption, at the communication device, when being connected to the second wireless network, when in an active mode of the communication device an established physical layer and an established data link layer of the first network are required for data transmission, establishing by a controller unit a first communication link between the communication device and the first network over the first interface, and, when in an idle mode of the communication device the established physical layer and the established data link layer of the first network are dispensable for data transmission, disconnecting by the controller unit the first communication link and establishing a second communication link between the communication device and the second wireless network over the second interface. The first network may be a local area network such as IEEE 802.3 Ethernet or a global area network such as GSM (Global Standard for Mobile communication). The second wireless network may be an IEEE 802.15.4 low rate wireless personal area network. The IEEE 802.15.4 standard specifies the physical layer and media access control for Low Rate Wireless Personal Area Networks (LR-WPANs). The reach of such a Wireless Personal Area Network (WPAN) varies from a few centimeters to a few meters. A Personal Area Network (PAN) may also be carried over wired computer buses such as USB (Universal Serial Bus) and FireWire. The second wireless network may also be and/or comprise ZigBee, ISA 100.11a, WirelessHART, and/or MiWi specifications, each of which defining networks extending the standard of IEEE 802.15.4 by developing the upper layers which are not defined by this standard. The second wireless network may also be built as a Wireless Embedded Internet by using 6L0WPAN and standard internet protocols.

DETAILED DESCRIPTION OF THE INVENTION

As previously noted, embodiments may lower the power consumption of a communication device connected to a network by the provision of a method of operating the communication device, a computer program product for executing the method, and a respective communication device. The lowered power consumption of the communication device should be realized in a simple way which is low-cost, leads to a low power consumption in the idle mode, sufficient bandwidth for data transmission available in the active mode, and allow for switching between the idle mode and the active mode controllable from the network.

An inventive method of operating a communication device comprises the following steps. Providing the communication device with a first interface to connect to a first network, which provides a first bandwidth and a first network idle power consumption at the communication device, when being connected to the first network, providing the communication device with a second interface to connect to a second wireless network, which provides a second bandwidth, which is smaller than the first bandwidth, and a second network idle power consumption, which is smaller than the first idle power consumption, at the communication device, when being connected to the second wireless network, when in an active mode of the communication device an established physical layer and an established data link layer of the first network are required for data transmission, establishing by a controller unit a first communication link between the communication device and the first network over the first interface, and, when in an idle mode of the communication device the established physical layer and the established data link layer of the first network are dispensable for data transmission, disconnecting by the controller unit the first communication link and establishing a second communication link between the communication device and the second wireless network over the second interface. The first network may be a local area network such as IEEE 802.3 Ethernet or a global area network such as GSM (Global Standard for Mobile communication). The second wireless network may be an IEEE 802.15.4 low rate wireless personal area network. The IEEE 802.15.4 standard specifies the physical layer and media access control for Low Rate Wireless Personal Area Networks (LR-WPANs). The reach of such a Wireless Personal Area Network (WPAN) varies from a few centimeters to a few meters. A Personal Area Network (PAN) may also be earned over wired computer buses such as USB (Universal Serial Bus) and FireWire. The second wireless network may also be and/or comprise ZigBee, ISA100.11a, WirelessHART, and/or MiWi specifications, each of which defining networks extending the standard of IEEE 802.15.4 by developing the upper layers which are not defined by this standard. The second wireless network may also be built as a Wireless Embedded Internet by using 6L0WPAN and standard internet protocols.

The controller unit may be a microcontroller unit or microcontroller or a central processing unit. Not integrated, discrete or partially discrete solutions of a controller may be used as a controller unit as well. The first network may be a wireless or wired network. For example, the first network may be a wireless GSM-network or a wired Ethernet-LAN. With the power consumption of the communication device in the idle mode comprising the power consumption of the communication device and the power consumption of the network at the interface the communication device is connected to the network, the power consumption of the communication device in the idle mode depends on the kind of network the communication device is connected to. Since the power consumption of the communication device in idle mode is lower with the communication device being connected to the second wireless network then being connected to the first network, the communication device when being operated in the idle mode is advantageously disconnected from the first network and connected to the second wireless network by establishing a second communication link between the communication device and the second wireless network of the second interface. On the other hand, with a larger power consumption of a network usually being associated with a larger possible bandwidth, when the communication device is operated in the active mode, a first communication link is established between the communication device and the first network over the first interface for transmission of payload data. The inventive method thus combines the advantages of two networks by utilizing a first network with a larger power consumption for transmission of data at sufficient bandwidth, e.g. payload data, while utilizing a second wireless network with a lower power consumption in the idle mode when the higher bandwidth of the first network is not required, e.g. only signaling data is to be transmitted. For transmitting signaling data, the bandwidth of the second network may be sufficient whereas for transmission of payload data it is not. This way in the communication device a transceiver of a first wired or wireless network may be advantageously combined with a second transceiver of a second wireless network to operate in the idle mode with a lower power consumption and to operate in the active mode with a larger bandwidth which may be required for transmission of data, e.g. real time and/or bidirectional data such as speech and/or video data. Thus, the active mode may be required if a higher bandwidth and/or a lower latency are/is needed for (uninterrupted) data transmission than the wireless second network connection could offer. The bandwidth requirement and/or latency requirement are/is dependent upon the quality of service associated with the data to be transmitted. For example, video data usually has higher requirements in bandwidth and/or latency than speech data, whereas speech data usually has higher requirements in bandwidth and/or latency than transmitting data files such as text and/or picture data. Additionally, the bandwidth requirement and/or latency requirement are/is dependent on the codec used. By combining the advantage of the first network of a larger bandwidth and the lower power consumption in the idle mode of the second wireless network and eliminating the disadvantage of a larger power consumption in the idle mode of the first network and the lower bandwidth of the second wireless network the advantages of both networks are combined, the disadvantages of both networks are eliminated and redundancy emerges by using both networks in the communication device.

When the communication device is operated in the active mode, the communication device may be operated to route information from the first network over the second interface to another communication device which has been disconnected from the first network and which is connected to the second wireless network. This way, the communication device which is connected to the first network over the first interface acts as a router for another communication device which is not connected to the first network directly but indirectly by using the communication device as a router connecting the first network with the second wireless network. When acting as a router, the respective communication device connected to the first network over the first interface may be operated in the active mode in order to be able to use the physical and data link layers of the first network for data transmission. Several other communication devices may be connected in the idle mode with the first network via the communication device routing information from the first network over the first interface and over the second interface and the second network to the other communication devices.

When the communication device is operated in the active mode, with advantage a communication device is operated to discover another communication device which has been disconnected from the first network and is connected to the second network and to inform the first network or any device comprised by the network about the other communication device over the first interface. This way, the reach of the first network is extended to other communication devices being in the idle mode and thus not connected to the first network over their first interfaces but being connected to and/or comprised by the second network over their second interfaces only. Since transmission of signaling and payload data is possible in the idle mode ever the second network, the other communication devices which are connected to the second network are able to send and receive information to at least one communication device acting as a router for routing information from the first network to the second network.

When the communication device is operated in the idle mode, in one embodiment the communication device is operated to exchange a keep-alive message with and to receive a power control instruction from another communication device connected to the second wireless network. The exchange of a keep-alive message with another communication device connected to the second wireless network while being in the idle mode allows for discovering this communication device by other communication devices connected to the second wireless network and routing the discovery of this communication device in form of a message to other communication devices connected to the first network in the case where at least one communication device acts as a router between the first network and the second network. The ability to receive a power control instruction from another communication device enables the communication device in the idle mode, when being connected to the second wireless network over the second interface and disconnected from the first network over the first interface, to be woken up by a respective power control instruction transmitted from another communication device acting as a router between the first network and the second wireless network resulting in a switch of the communication device from the idle mode to the active mode.

When the communication device is operated in the idle mode the communication device may be switched to the active mode if the communication device is requested to by a routed instruction received over the second interface. In this embodiment the switching to the active mode may be requested by a server of the first network or by algorithms for power management distributed over the first network. This way, the full functionality of the communication device in the idle mode is maintained while the communication device is not connected to the first network over its first interface. Instead, the communication device is switched to the active mode by a request of a server of the first network or by algorithms for power management distributed over the first network by reception of a routed instruction over the second interface of the communication device.

For maintaining a full functionality of the communication device, the communication device may be switched to the active mode, when the communication device is operated in the idle mode, if the communication device is disconnected from the second wireless network over the second interface. Consequently, the communication device is connected to the first network over the first interface in the case of a disconnection of the communication device from the second wireless network over the second interface. Another case where the communication device is switched to the active mode, when being operated in the idle mode, occurs if a power supply of the communication device indicates a dysfunction. For example, the power supply of the communication device may comprise & rechargeable battery and the rechargeable battery is only charged when the communication device is operated in the active mode, thus being connected to the first network over the first interface. The charging power may originate from Power over Ethernet (PoE) of a wired Ethernet LAN as the first network. If the rechargeable battery of the communication device is no longer able to provide a sufficient power supply for the communication device to maintain its idle mode, for example due to loss of charge, the communication device is switched from its idle mode to the active mode for the rechargeable battery to be charged as long as the rechargeable battery allows for the switch from the idle mode to the active mode. Thus, the communication device may be operated in the active mode if a MCU of the communication device is busy and/or peripherals of the communication device need/needs power which is not available from the rechargeable battery or capacitor of the communication device. The communication device is also operated in active mode if the power level of the rechargeable battery or capacitor is lower than a predetermined threshold value, too low to maintain the idle mode, or if the rechargeable battery or capacitor is charged. The switching from the idle mode to the active mode may be initiated by the communication device in the idle mode itself or by an instruction of another communication device connected over its first interface to the first network and/or over its second interface to the second network.

When the communication device is operated in the active mode, the communication device may be switched to the idle mode if the rechargeable battery is fully charged. This measure is particularly useful when the communication device is not operated by a user and the idle mode should be maintained as long as possible with the advantage of low power consumption when the communication device is connected to the second wireless network over the second interface. Here, the rechargeable battery should be fully charged before switching from the active mode to the idle mode, in order to keep the communication device connected to the second wireless network for a longest possible period of time. The charging of the rechargeable battery in the active mode, when the communication device is connected to the first network over the first interface may be done by using a power source independent from the first network and from the second wireless network or by using Power over Ethernet when a wired Ethernet LAN is used as the first network.

For being able to take advantage of the physical and data link layers of first network for transmitting date, the communication device may be operated to switch from the idle mode to the active mode by a user input of a user of the communication device. The user input may be in the form of taking a handle of the communication device off-hook or by pushing any button located on the communication device or a remote device such as a computer connected to the communication device, e.g. over a CTI-interface. The button may be in the form of a mechanical button, a touchless-button, a touchpad, a keypad or the like.

To maintain the full functionality of the communication device, it is useful, when the communication device is operated in the idle mode to operate the communication device to transmit a message to another communication device connected to the second wireless network if the communication device cannot be connected to the first network over its first interface and/or the communication device cannot be charged. This way, when the communication device cannot be connected to the first network over its first interface, at least other communication devices being connected to the second network can be reached by transmitting a message from the communication device to these other communication devices. Therefore, at least communication devices being connected to the second wireless network are reachable by the communication device in the idle mode, which may particularly be helpful in the case of emergency. To avoid a breakdown of the communication device caused by power failure, a single or other communication devices being connected to the second wireless network may be reached by the communication device over its second interface by transmitting a message to the single or these other devices when the communication device cannot be charged.

A computer program product may be provided for executing the inventive method as outlined above. The computer program product may be a software product comprising instructions. The computer program product may be comprised by a machine-readable medium, wherein the machine-readable medium may be a floppy disc, a CD (Compact Disc), a DVD (Digital Versatile Disc), or any other suitable digital or analog medium.

The invention further comprises a communication device comprising: A first interface for connecting the communication device to a first network, which provides a first bandwidth and a first network idle power consumption at the communication device, when being connected to the first network, a second interface for connecting the communication device to a second wireless network, which provides a second bandwidth, which is smaller than the first bandwidth, and a second network idle power consumption, which is smaller than the first idle power consumption, at the communication device at the communication device, when being connected to the second wireless network, and a controller unit configured to control the first interface and the second interface such that, when in an active mode of the communication device an established physical layer and an established data link layer of the first network are required for data transmission, establishing a first communication link between the communication device and the first network over the first interface, and, when in an idle mode of the communication device the established physical layer and the established data link layer of the first network are dispensable for data transmission, disconnecting the first communication link and establishing a second communication link between the communication device and the second wireless network over the second interface. The object of the invention is solved by this communication device for the same reasons as outlined above with respect to the inventive method. The communication device may be a mobile phone, a wired phone such as an office phone, a PDA (Personal Digital Assistant, a PC (personal computer) or tablet PC, or any other communication device comprising the apparatus features as outlined above.

The invention further comprises a communication system comprising the communication device as outlined above, the first network and the second wireless network. The first network and the second wireless network may be networks as described in connection with the inventive method. For example, the first network may be a global area network such as GSM or a local area network such as an Ethernet. The second wireless network may be an a wireless LAN or an IEEE 802.15.4 low rate wireless personal area network.

Further embodiments and advantages of the invention are highlighted in the following with respect to figures. For an improved clearness, the figures are not true to scale or proportionate. In the figures, as long as not mentioned otherwise, same references indicate same parts with same meaning.

Figure 1:
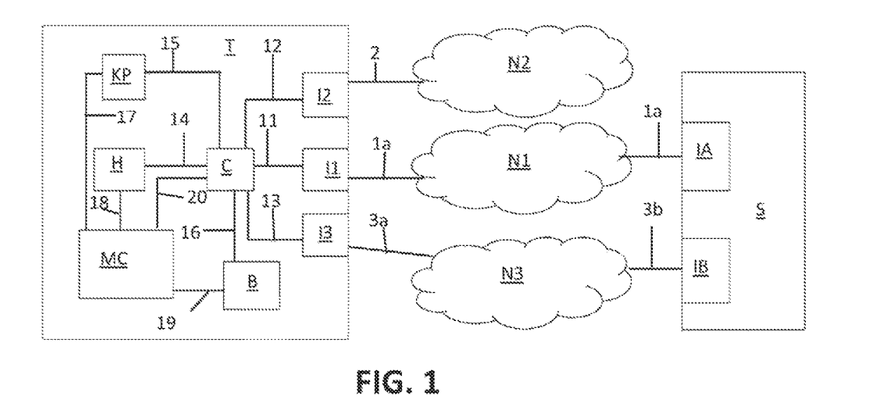
FIG. 1 a schematic diagram of a communication system according to the invention, FIGS. 2A to 2G schematic diagrams of communication devices according to the invention connected to the first network and the second wireless network in different embodiments, FIG. 3 the inventive communication system wherein the first network is an Ethernet and the second network is a low rate wireless personal area network, and FIG. 4 a flowchart for switching between the idle mode and the active mode according to the invention.

In FIG. 1, an inventive communication device is represented by a communication terminal T. The communication terminal may be a mobile phone, IP phone, or a wired phone such as an office phone. The communication terminal T comprises an interface I1, wherein a first network N1 is connected to the interface I1 over a first connection link IA. The first network N1 is further connected to another interface IA of a server S over another communication link IB. The first network N1 may be a local area network such as the Ethernet or a global area network such as GSM. The communication terminal further comprises a third interface I3, wherein the communication terminal T is connected to the server S over connection links 3A, 3B via a network N3. The network N3 may be a Public Switched Telephone Network (PSTN) complementing the network N1 for a redundant connection between the communication terminal T and the server S. The communication terminal T further comprises a second interface I2, wherein the communication terminal T is connected over the second interface I2 to a second wireless network N2 over a second communication link 2. The second wireless network may be a wireless personal area network, for example the IEEE 802.15.4 low rate wireless personal area network. When connected to the first network for data transmission over the first interface the communication device when being operated in the idle mode has a first power consumption which is larger than the second power consumption which the communication device T has when being connected to the second wireless network N2 for data transmission over the second interface I2. A first bandwidth of the first network is larger than a second bandwidth of the second network usable by the communication device T when being connected to the first and second networks, respectively. Therefore, the first network may be a GSM-network while the second wireless network may be a wireless LAN. Alternatively, the first network may be a wireless or wired LAN while the second wireless network may be a wireless personal area network.

The interfaces I1, I2, I3 are connected to a controller unit C over connection links 11, 12, 13. The controller unit may be a microcontroller or a central processing unit. A keypad KP is connected to the controller unit C over a connection link 15 and a handle H of the communication terminal T is connected to the controller unit C over connection link 14. If a button of the keypad KP is pushed or the handle H is taken off-hook, the communication terminal T switches from an idle mode, in which a physical layer and a data link layer of the first network N1 are dispensable or not required for data transmission, to an active mode, in which the physical layer and the data link layer of the first network N1 are required or necessary for data transmission of a predetermined quality of service. The data transmission may be according to data to be transmitted from the user of the communication terminal T to another communication device such as the server S or vice versa. When the communication terminal is operated to switch to the active mode, the controller unit C establishes the first communication link 1A between the communication terminal T and the first network N1 over the first interface I1 for the transmission of payload data. If the user is not using the communication terminal, for example by putting the handle H on-hook or by not pushing a button of the keypad KP for a determined period of time, the communication terminal T is operated to switch to the idle mode. In this case, the controller unit C disconnects the first communication link 1A and establishes the second communication link 2 between the communication terminal T and the second wireless network N2 over the second interface I2. In the idle mode, a possibly present communication link 3A between the interface I3 and the network N3 is disconnected by the controller unit C as well. In the idle mode, the communication terminal is thus connected only to the second wireless network N2 over the second communication link 2 and the interface I2.

The controller unit C is further connected to a rechargeable battery B over a connection link 16. The rechargeable battery which may be in the form of capacitor is only charged if the communication terminal T is connected to the first network N1 over the interface I1 and the first connection link 1A. If the first network is a wired local area network, the power supply may be established by Power over Ethernet. This way, the electrical current necessary for the operation of the communication terminal T is carried by the data cables of the LAN rather than by separate power cords. Alternatively, the rechargeable battery B may be charged by a power source independent of the first network N1 which may be the GSM. If the rechargeable battery is fully charged, the communication terminal T is switched from the active mode to the idle mode, this being disconnected from the first network over the first interface I1 and being connected to the second wireless network over the second interlace I2. If the communication terminal is in the idle mode, thus being only connected to the second wireless network, the communication terminal T is switched to the active mode if the rechargeable battery is no longer able to supply the communication terminal T with energy sufficient to maintain the idle mode. In this case, the rechargeable battery B as the power source of the communication terminal T indicates a dysfunction to the controller unit C. The active mode and the idle mode of the communication terminal T may be displayed to a user of the communication terminal T by a display (not shown).

A microcontroller MC for controlling functions of the communication terminal T is present and connected to the keypad KP, the handle H, and the rechargeable battery B over connection links 17, 18, 19. The microcontroller MC is further connected to the controller unit C over a connection link 20. The controller unit C for establishing the first communication link 1A and the second communication link 2 dependent upon the active mode and the idle mode may thus be supervised by the microcontroller MC. Alternatively, the microcontroller MC and the controller C are not separate entities but integrated either into the microcontroller MC or into the controller unit C. A separate controlling unit C in addition to the present microcontroller MC is useful if the communication terminal T is upgraded to be able to perform the inventive method. When being operated in the active mode, the terminal T may be instructed by the server S over the communication link IB, the first network N1, the first communication link 1A and the interface I1 to be switched from the active mode to the idle mode. If in the active mode the communication terminal T is not only connected to the first network N1 over the first interface I1 but also connected to the third network N3 over the third interface I3, the server S may transmit an instruction to switch the communication terminal T from the active mode to the idle mode over the communication link 3B, network N3, communication link 3A, and interface I3 as well.

Figure 2A:
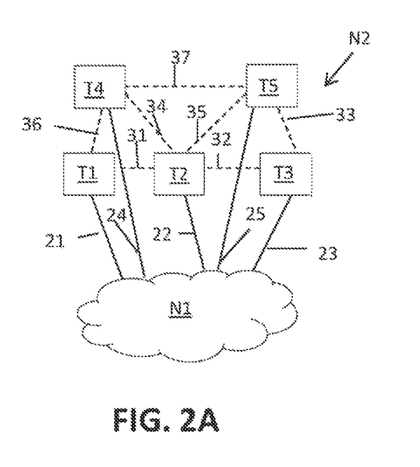

In FIG. 2A, several communication devices in form of communication terminals T1, T2, T3, T4, T5 are connected to a first network N1 over communication links 21, 22, 23, 24, 25. Simultaneously, the communication terminals T1-T5 are interconnected in a point-to-point, also called peer-to-peer, second wireless network N2. The communication links 31-37 of the second wireless network N2 are shown in FIG. 2A, as also is the case in FIGS. 2B-2F, as dashed lines in order to distinguish the communication links 31-37 of the second wireless network N2 from the communication links 21-25 of the first network N1 (straight lines). The communication system of FIG. 2A represents several communication devices T1-T5 in a busy time, where all the communication devices in form of communication terminals T1-T5 are in use and in the active mode by being connected to the first network N1 over their first interfaces I1. If the first network is an Ethernet LAN, as depicted in FIG. 2A, the Ethernet connections of all communication terminals T1-T5 are established through which the communication terminals T1-T5 are powered via Power over Ethernet resulting in charging the rechargeable battery B comprised by each of the communication terminals T1-T5. In the active mode, the microcontroller unit MC comprised by each of the communication terminals T1-T5, can work with full frequency if required to execute the functions as accessed by each of the users of the communication terminals T1-T5. In the active mode, the communication links 21-25 are maintained not only if the first network N1 is in an active state, but also if the first network N1 is in a low power state. This situation may occur if during a phone call none of the participants of the phone call talks while the connection between the participants is established. The communication terminals T1-T5 are in the active mode and therefore connected to the first network N1 over their first interfaces I1 while being also connected to the second wireless network N2 over their second interfaces I2 which is constituted by the communication 31-37 connecting the communication terminals T1-T5.

Figure 2B:
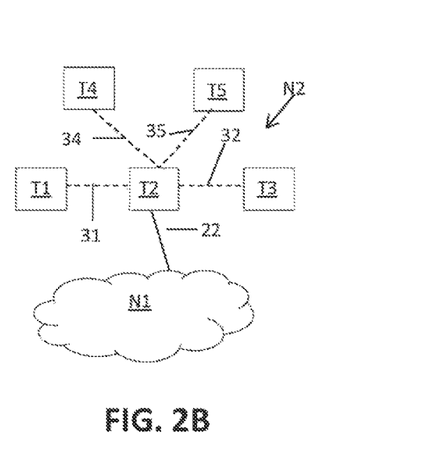

In FIG. 2B, instead of a peer-to-peer or point-to-point second wireless network N2, the communication terminals T1-T5 are interconnected by communication links 31, 32, 34, 35 in a star pattern or star configuration. With respect to the second wireless network N2, the communication terminals T1, T3, T4, and T5 constitute endpoints of the second wireless network N2. The communication terminals T1, T3, T4, and T5 are in idle mode wherein these communication terminals are not connected to the first network N1 over then respective first interfaces I1 (not shown in FIG. 2). The communication terminal T2 is in active mode and linked to the first network N1 over communication link 22. In the case, where the first network is an Ethernet LAN and the second wireless network is a low rate wireless personal area network, in the communication terminals T1, T3, T4, and T5 the Ethernet physical layer is switched off, leading to a disconnection of these communication terminals from the first network over their first interfaces. In communication terminals T1, T3, T4, T5 a rechargeable battery B or a capacitor is used in each of these terminals for power supply since no other power source is available neither by Power over Ethernet nor in form of another power source being independent from the first network N1. A microcontroller unit (MCU) which may be present in each of the communication terminals T1, T3, T4, and T5 may be operated in power save mode. With the bandwidth of the second wireless network being smaller than the bandwidth of the first network, each of the communication terminals T1, T3, T4, and T5 sends keep-alive messages over radio frequency to indicate to other communication devices that the communication terminals T1, T3, T4, and T5 may be switched from the idle mode to the active mode. The power consumption of the communication terminals T1, T3, T4, and T5 is approximately 1-10 µW. In contrast to the communication terminals T1, T3, T4, and T5, the communication terminal T2 is in active mode and able to route information from the first network N1 over the communication link 22, its first interlace I1, and its second interface I2 to the other communication terminals T1, T3, T4, and T5 thus linking the communication terminals T1, T3, T4, and T5 to the first network although these communication terminals have been disconnected from the first network over their respective first interfaces. By using the communication terminal T2 as a router between the first network and the second wireless network N2, a server S of the first network N1 may transmit a power control instruction over the communication terminal T2 to each of the communication terminals T1, T3, T4, and T5 to be woken up from the idle mode into the active mode. This way, the reach of the first network N1 is extended to communication terminals T1, T3, T4, and T5 by using the communication terminal T2 as a router.

Figure 2C:
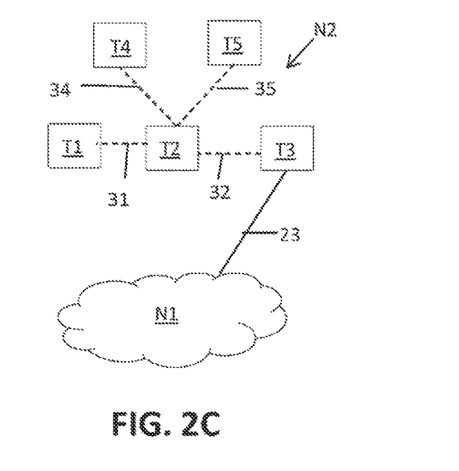

Another configuration of a communication system according to the invention is illustrated in FIG. 2C. The star pattern or star configuration of the communication terminals T1-T5 is the same as illustrated in FIG. 2B. However, instead of the communication terminal T2 being connected to the first network N1 over communication link 22, in FIG. 2C the communication terminal T3 is in active mode and connected to the first network N1 via communication link 23. With the communication terminal T3 acting as a router between the first network N1 and the second wireless network N2 routed information, also called rout information, from the first network N1 may be transmitted over communication link 23, the first interface I1 of the communication terminal T3, second interface I2 of this terminal and over communication link 32 to communication terminal T2. Communication terminal T2 is acting as a coordinator of the second wireless network N2 by distributing the route information of the first network N1 to the communication terminal T1 over communication link 31, to the communication terminal T4 over communication link 34, and to communication terminal T5 over communication link 35. Although communication terminal T3 is an endpoint with respect to the second wireless network and is an endpoint with respect to the first network, this terminal is important to connect the communication terminals T1, T2, T4, and T5 of the second wireless network to the first wireless network N1. The communication terminal T2 is important for connecting the communication terminals T1, T4, and T5, each of which is operated in the idle mode, to the first network N1 over communication terminal T3.

Figure 2D:
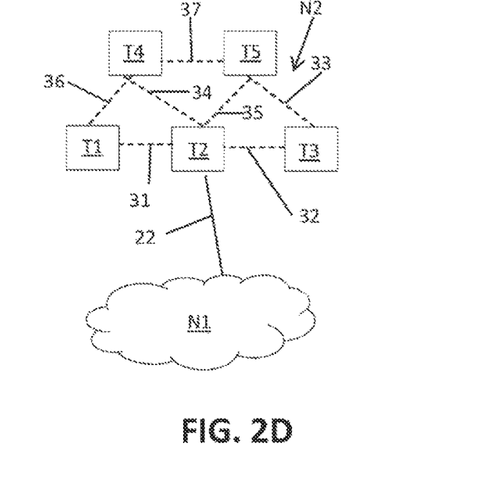

A higher degree of redundancy is reached with respect to the second wireless network N2 by a peer-to-peer or point-to-point network as illustrated in FIG. 2D. If communication link 34 between communication terminal T2 and communication terminal T4 fails, route information from the communication terminal T2 is still transmitted to communication terminal T4 over communication link 31, communication terminal T1, and communication link 36. However, there is no redundancy with respect to the first network N1 since only a single communication terminal T2 is connected to the first network N1 over communication link 22 to route information from the first network N1 to communication terminals T1, T3, T4, and T5 of the second wireless network N2.

Figure 2E:
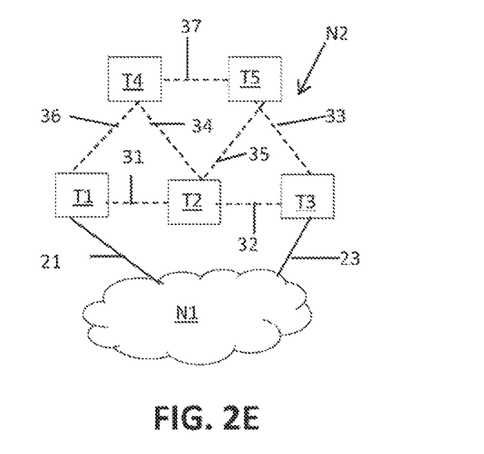

A higher degree of redundancy with respect to the first network N1 is reached by the communication system as illustrated in FIG. 2E. Instead of only one communication terminal, T2 in FIG. 2D, being connected to the first network N1, the communication terminal T1 is connected to the first network over communication link 21 and the communication terminal T3 is connected to the first network N1 over communication link 23. Both communication terminals T1, T3 act as separate routers for routing information from the first network N1 to the second wireless network N2. Thus, communication terminal T4 may receive routing information from the first network N1 either over communication terminal T1 or over communication terminal T3. Compared to the configurations of the communication systems as depicted in FIG. 2B and FIG. 2C, there is a trade-off between the required redundancy with respect to the first network N1 and the second wireless network N2 and the required maintenance effort for maintaining the communication links necessary to be established to provide the required degree of redundancy. The total power consumption of the first network N1 and the second wireless network N2 hereby increases with an increase of the number of communication links of each of these networks.

Figure 2F:
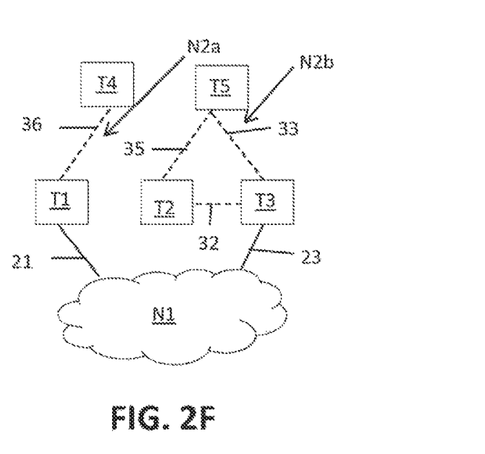

A further configuration of the inventive communication system is illustrated in FIG. 2F, where a second wireless network N2a is constituted or built by communication terminals T1 and T4 and another second wireless network N2b is built by communication terminals T2, T3, and T5. The second wireless network N2a is connected to the other second wireless network N2b over the first network N1.

Figure 2G:
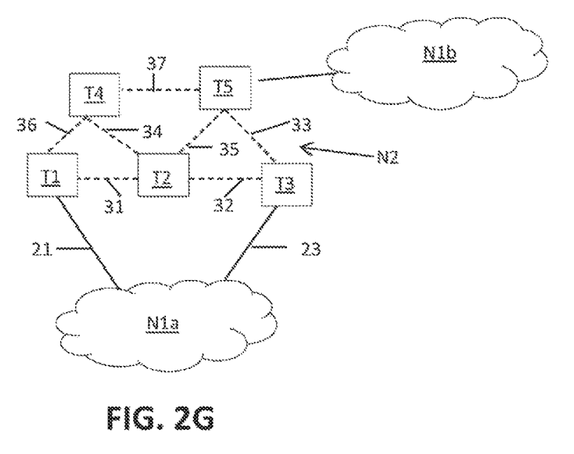

A further embodiment of the invention is illustrated in FIG. 2G where the configuration as illustrated in FIG. 2E is extended by another first network N1b in addition to a first network N1a representing the first network N1 in FIG. 2E. The second network N2 built by communication terminals T1-T5 is thus connected to the other first network N1b over communication terminal T5 and communication link 27 and at the same time connected to the first network N1a a over communication terminal T1, communication link 21, and communication terminal T3 and communication link 23. The first network N1a may be a LAN whereas the other first network N1b may be a GSM network. The second wireless network N2 may be a low rate wireless personal area network allowing each of the communication terminals T2 and T4 to be woken up by routed information of the first network N1a and the other first network N1b.

Figure 3:
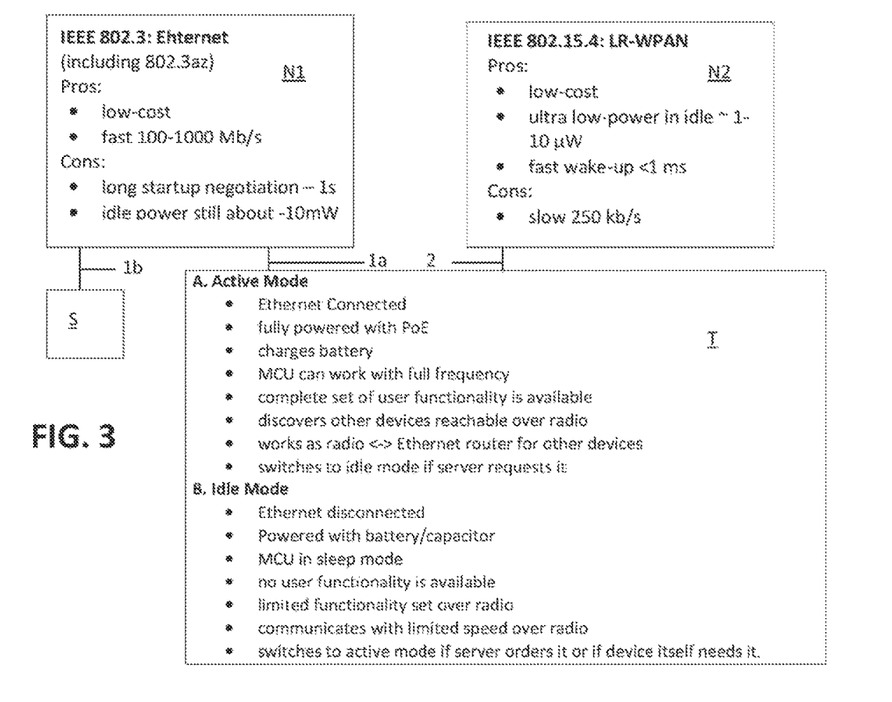

In FIG. 3, the invention is illustrated in an embodiment of the first network N1 being an IEEE 802.3 Ethernet and the second wireless network N2 being an-IEEE 802.15.4 LR-WPAN. As illustrated in FIG. 1, the first network N1 is connected to a server S over a connection link IB and connected to the communication terminal T over the first connection link 1A. The second wireless network N2 is connected to the communication terminal T over the second communication link 2. The first network N1 has the advantages of being a low-cost network with fast transfer rates of approximately 100-1,000 Mb/s. The first network N1, on the other side, shows a long startup negotiation time of approximately 1 s and a power consumption in the idle mode of approximately 10 mW. In contrast to the first network N1, the second wireless network N2 shows a slow transfer rate of approximately 250 kb/s and the advantages of being a low-cost network, having a power consumption in the idle mode of only 1-10 µW and a fast wake-up time of smaller than one ms corresponding to the start-up negotiation time of the first network N1.

In the active mode the communication terminal T1 is connected to the first network N1, the terminal is fully powered using Power over Ethernet, a rechargeable battery or capacitor is being charged by Power over Ethernet, and a MCU may be able to work at full frequency allowing the user to take advantage of a complete set of user functionality of the communication terminal. Further, the communication terminal T works as a radio/Ethernet router for other communication devices which have been disconnected from the first network N1 over their first interfaces and which are connected to the second wireless network N2 over their second interfaces as illustrated in FIG. 2B to 2G. The communication terminal T being connected to the second network N2 over its second interface I2 while being connected to the first network N1 over its first interface I1 in the active mode is able to discover other communication devices which have been disconnected from the first network N1 and which are reachable only over the second wireless network N2. With the communication terminal T being connected to the first network N1 over the first communication link 1A the communication terminal T may be switched to the idle mode if the server B sends a respective request to the communication terminal T over the communication link IB, the first network N1 and the first communication link 1A to the communication terminal T.

In the idle mode, the communication terminal T is disconnected from the Ethernet as the first network N1 over its first Interface I1 (not shown). A rechargeable battery/capacitor is the only power source for the communication terminal T since due to its disconnection from the first network N1 Power over Ethernet is not available. Caused by the idle mode the MCU of communication terminal T is in sleep mode, causing no user functionality of the communication terminal T to be available. Alternatively, a limited functionality set over radio by using the second wireless network could be provided for example for emergency operation if the Ethernet of the first network fails or if the power supply for the communication terminal T cannot be maintained. In the idle mode, the communication terminal is able to send keep-alive messages and to receive power control commands or instructions from other devices of the second wireless network, thus communicating with other devices of the second wireless network N2 with limited data transfer speed or rate over radio compared to the speed possible by communicating over the first network. A communication terminal in the active mode discovering the communication terminal T in the idle mode may inform the server S of the communication T in the idle mode by the communication terminal T sending keep-alive messages to a communication terminal of the second wireless network acting as a router between the first network and the second wireless network. With the communication terminal T in the idle mode being connected to the first network N1 over its second interface I2 and another communication terminal of the second wireless network N2 acting as a router for routing information from the first network N1 to each of the communication terminals of the second wireless network N2 the communication terminal T may be switched to the active mode if the server S orders it by sending an activation request. Alternatively, the communication terminal T may switch itself from the idle mode to the active mode if the communication terminal is required to do so. This may be the case if the connection to the second wireless network is lost, if a rechargeable battery or capacitor is going out of charge, or if a user input requests the communication terminal to switch from idle mode to active mode.

As a protocol and/or a management means for operating the first network N1 and/or the second wireless network N2 may be considered: IPv6, 6L0WPAN, multi-channel MAC, centralized routing, muiti-homing, SCTP, RTP header compression or the like. The first network N1 and/or the second wireless network N2 may be configured as star networks, peer-to-peer or point-to-point networks, as illustrated in FIG. 2, or as cluster tree networks or a combination thereof.

Figure 4:
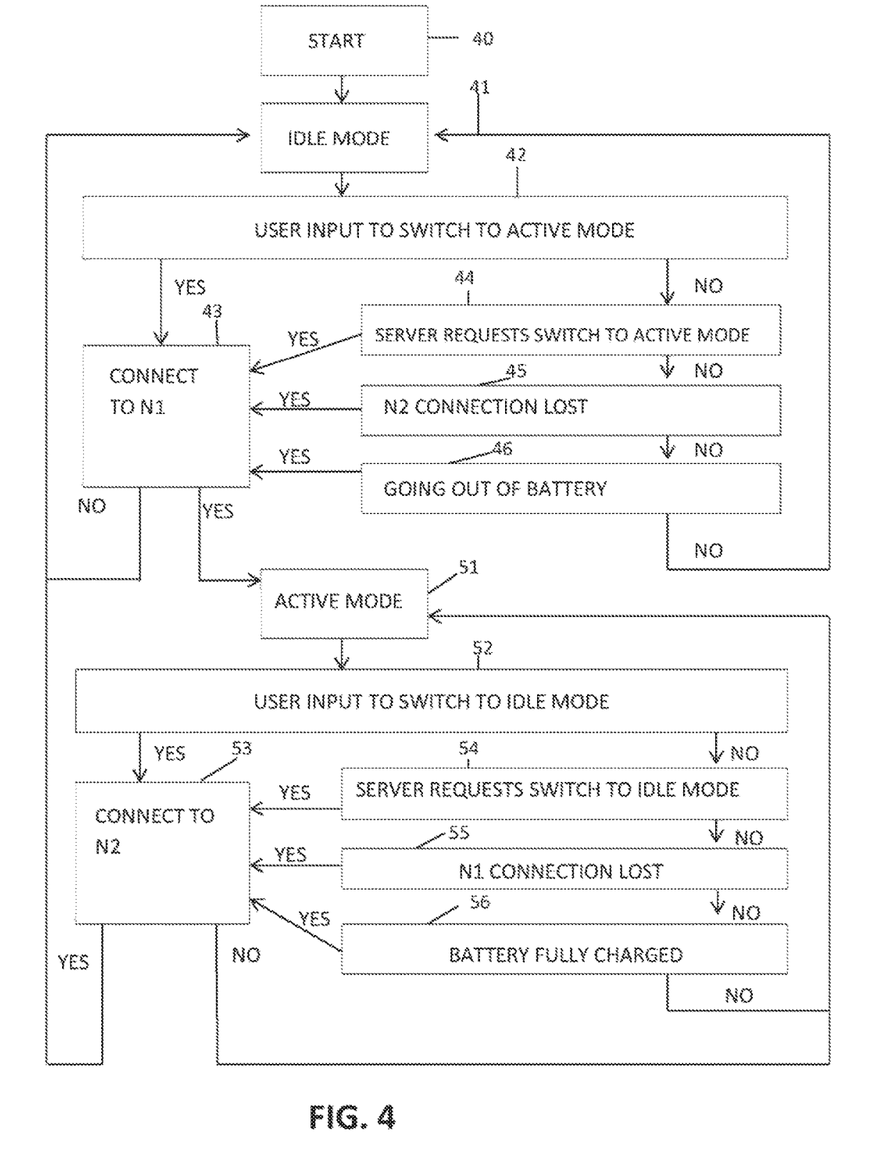

In FIG. 4, a flow chart of switching the communication device from the idle mode to the active mode and from the active mode and from the active mode to the idle mode is illustrated. As a starting point 40, the idle mode 41 may be chosen. If a user input in form of pushing a button of the communication device or taking a handle of the communication device off-hook occurs to switch to the active mode 42, the communication device is connected to the first network N1. If the connection to the first network N1 over the first interface I1 fails, the communication device stays in the idle mode 41 or sends a message to other devices of the second wireless network N2. If a connection to the first network N1 is established, the communication device is operated in the active mode 51. If no user input to switch to active mode is received by the communication device, the communication device still tries to establish a connection to the first network N1 if a server (as part) of the first network N1 requests the communication device to switch to active mode 44, if the connection to the second wireless network N2 is lost, or if a rechargeable battery B or a capacitor of the communication device is going out of charge. If none of these cases occurs, the communication device stays in idle mode.

If the communication device is switched to active mode 51, the communication device tries to connect to the second wireless network N2, S3, if requested to do so by user input to switch to idle mode. If such a connection of the communication device to the second wireless network N2 can be established, the communication device switches to the idle mode 41. If the connection to the second wireless network N2 cannot be established, the communication device stays in the active mode 51 to be able to be used even if no payload data is to be transmitted. If no user input to switch to idle mode is received by the communication device, an attempt to connect to the second wireless network still occurs if the server requests the communication device to switch to idle mode, 54, if the connection to the first network N1 is lost, 55, or if the rechargeable battery or capacitor is fully charged, 56. If none of these cases occurs, the communication device may still be used by a user and therefore stay in the active mode. Instead of a user input to switch to idle mode, the user input to switch to idle mode may be represented by a missing user input in a predetermined time window following the last user input.

A timer may be used for starting a time period of waiting for user input triggered by a previous user input.

A technical feature or several technical features which has/have been disclosed with respect to a single or several embodiments discussed hereinbefore, e.g. the timer for starting a time period of waiting for user input triggered by a previous user input in the embodiment of the last paragraph, may be present also in another embodiment except it is/they are specified not to be present or it is impossible for it/them to be present for technical reasons.

With the present invention two networks for transmitting signaling and payload data but having different properties at least with respect to power consumption in idle mode and available bandwidth are combined in a single communication device. This combination may not require hardware changes but may be established in form of a software update only not significantly increasing the manufacturing costs of the communication device. On the other side, advantages of both networks are combined in the communication device. If the first network is an Ethernet LAN and the second wireless network is a low rate wireless personal area network, the communication device is able to work with full Ethernet speed in the active mode and is able to reduce power consumption under 1 mW in the idle mode, while maintaining the possibility to communicate with a server of the first network and the possibility to be woken up remotely by a communication device of the first network and/or the second wireless network.

The invention claimed is:

1. A method of using a first communication device comprising a processor and a non-transitory computer readable medium, the method comprising:
 establishing a first communication link between a first communication device and a first network via a first interface of the first communication device when the first communication device is in an active mode, the first communication link configured for transmission of payload data between the first network and the first communication device;
 operating the first communication device to discover at least one second communication device that had been disconnected from the first network and is connected to a second network while the first communication device is in the active mode and operating the first communication device while in the active mode to function as a router when the first communication device is in the active mode to route information from the first network over a second interface of the first communication device to the discovered at least one second communication device that has been disconnected from the first network and that is connected to the second network such that the discovered at least one second communication device is linked to the first network via the first communication device operating as the router even though the at least one second communication device has been disconnected from the first network;

switching the first communication device from the active mode to an idle mode such that the first communication link is disconnected so that the first communication device is no longer connected to the first network over the first interface and a second communication link is established between the first communication device and the second network via a second interface of the first communication device such that signaling data is exchanged via the second communication link.

2. The method of claim 1, comprising:
switching the first communication device from the idle mode to the active mode in response to a request received over the second interface.

3. The method of claim 1, wherein the second network is a wireless network.

4. The method of claim 1, comprising:
switching the first communication device from the idle mode to the active mode in response to a request from a server of the first network received via the second communication link.

5. The method of claim 1, comprising:
switching the first communication device from the idle mode to the active mode in response to disconnection of the second communication link that connects the first communication device to the second network.

6. The method of claim 1, wherein the first communication device has a rechargeable battery that is charged when the first communication device is operated in the active mode.

7. The method of claim 6, comprising:
switching the first communication device from the active mode to the idle mode in response to the rechargeable battery being fully charged.

8. The method of claim 1, comprising:
switching the first communication device from the idle mode to the active mode in response to user input from a user of the first communication device.

9. The method of claim 1, comprising:
transmitting a message from the first communication device to a third communication device via the second communication link when at least one of: the first communication device cannot be connected to the first network and the first communication device cannot be charged.

10. A communication apparatus comprising:
a first communication device having hardware comprising a non-transitory computer readable medium and a processor, the first communication device also comprising:
a first interface configured to connect the first communication device to a first network that provides a first bandwidth and a first network idle power consumption at the first communication device when the first communication device is connected to the first network via the first interface;
a second interface configured to connect the first communication device to a second network that provides a second bandwidth that is smaller than the first bandwidth and a second network idle power consumption that is smaller than the first idle power consumption at the first communication device when the first communication device is connected to the second network via the second interface;
a controller unit configured to control the first interface and the second interface, the controller unit configured to control the first and second interfaces such that the first communication device is switchable between an active mode in which the first communication device is connected to the first network via the first interface and an idle mode in which the first communication device is connected to the second network via the second interface and is not connected to the first network via the first interface;
the controller unit configured to control the first and second interfaces such that:
the first communication device is configured to establish a first communication link with the first network over the first interface when in the active mode, the first communication link configured so that payload data is transmittable between the first communication device and first network via the first interface, and
the first communication device is switched from the active mode to the idle mode such that the first communication link is disconnected and a second communication link is established between the first communication device and the second network via the second interface so that signaling is providable via the second communication link;
the first communication device configured to exchange a signaling message and to receive a power control instruction from a second communication device connected to the second network when in the idle mode such that the first communication device is switchable from the idle mode to the active mode in response to a request to wake the first communication device received via the second communication link; and
the first communication device configured to discover at least one third communication device that was disconnected from the first network and is connected to the second network to inform the first network of the at least one third communication device via the first interface when in the active mode and being configured to operate as a router when in the active mode to route information from the first network over the second interface to the at least one third communication device so that the at least one third communication device is linked to the first network via the second interface of the first communication device.

11. The communication apparatus of claim 10, comprising:
the first network and the second network;
the first network being a local area network or a global area network and the second network being a wireless personal area network in accordance with IEEE 802.15.4.

12. The communication apparatus of claim 11, comprising:

the at least one third communication device, the at least one third communication device comprising a plurality of communication devices.

13. A non-transitory computer readable medium having code stored thereon that defines a method that is performed by a first communication device when at least one processor of the first communication device runs the code, the method comprising:

discovering a second communication device that has been disconnected from a first network and is connected to a second network when the first communication device is in an active mode to route information from the first network over a second interface to the second communication device that has been disconnected from the first network and that is connected to the second network such that the second communication device is linked to the first network via the first communication device operating as a router while in the active mode;

inform the first network about the second communication device via a first interface of the first communication device to link the second communication device to the first network via the first communication device operating as the router even though the second communication device has been disconnected from the first network such that the second communication device is connected to the first network via the first communication device operating as the router;

disconnecting the first communication link and establishing a second communication link between the first communication device and the second network via the second interface such that signaling data is transmitted via the second communication link in response to the first communication device being adjusted from the active mode to an idle mode; and operating the first communication device in the idle mode to exchange signaling data with a third communication device connected to the second network via the second communication link.

14. The non-transitory computer readable medium of claim 13, wherein the first communication device has a first idle power consumption and a first bandwidth when operated in the active mode and connected to the first network via the first interface and the first communication device has a second bandwidth that is smaller than the first bandwidth and a second idle power consumption that is smaller than the first idle power consumption when operated in the idle mode and connected to the second network via the second interface.

15. The non-transitory computer readable medium of claim 14, wherein the first communication device is only configured to transmit signaling to the first network via the second interface when in the idle mode and is unable to transmit payload data when in the idle mode.

16. The non-transitory computer readable medium of claim 15, wherein the first communication device is configured to transmit payload data and signaling via the first network when in the active mode.

17. The non-transitory computer readable medium of claim 16, wherein the first network is a local area network and the second network is a wireless personal area network.

18. The non-transitory computer readable medium of claim 14, wherein the method also comprising:
switching the first communication device from the idle mode to the active mode in response to a request from a server of the first network received via the second interface.

19. The non-transitory computer readable medium of claim 13, wherein the method also comprising:
transmitting a message from the first communication device to the third communication device via the second communication link when the first communication device is in the idle mode and cannot be connected to the first network.

20. The non-transitory computer readable medium of claim 13, wherein the first communication device has a rechargeable battery, and the method comprising:
transmitting a message from the first communication device to the third communication device via the second communication link when the first communication device is in the idle mode and the rechargeable battery cannot be charged.

* * * * *